United States Patent
Williams

(10) Patent No.: US 9,205,841 B2
(45) Date of Patent: Dec. 8, 2015

(54) SYSTEM AND METHOD FOR COMPUTING SLOPE OF A ROAD IN AN ELECTRIC VEHICLE

(71) Applicant: Joel Robert Williams, San Jose, CA (US)

(72) Inventor: Joel Robert Williams, San Jose, CA (US)

( * ) Notice: Subject to any disclaimer, the term of this patent is extended or adjusted under 35 U.S.C. 154(b) by 53 days.

(21) Appl. No.: 14/221,610

(22) Filed: Mar. 21, 2014

(65) Prior Publication Data

US 2015/0266483 A1  Sep. 24, 2015

(51) Int. Cl.
| | |
|---|---|
| *B60W 40/076* | (2012.01) |
| *B60L 11/18* | (2006.01) |
| *B60L 3/12* | (2006.01) |
| *B60L 7/18* | (2006.01) |
| *B60W 50/14* | (2012.01) |

(52) U.S. Cl.
CPC .............. *B60W 40/076* (2013.01); *B60L 3/12* (2013.01); *B60L 7/18* (2013.01); *B60L 11/1861* (2013.01); *B60W 50/14* (2013.01)

(58) Field of Classification Search
CPC .............. B60W 40/076; B60W 50/14; B60W 2550/142; B60L 3/12; B60L 7/18; B60L 11/1861
See application file for complete search history.

(56) References Cited

U.S. PATENT DOCUMENTS

| | | | | |
|---|---|---|---|---|
| 6,177,773 | B1 * | 1/2001 | Nakano et al. ................. | 318/376 |
| 6,507,127 | B1 * | 1/2003 | Amano ................. | B60L 11/123 |
| | | | | 290/40 A |
| 2002/0120382 | A1 * | 8/2002 | Hatanaka et al. ............... | 701/70 |
| 2012/0143435 | A1 * | 6/2012 | Cho et al. ...................... | 701/33.4 |
| 2012/0179319 | A1 * | 7/2012 | Gilman et al. .................. | 701/22 |
| 2013/0144501 | A1 * | 6/2013 | Yang et al. ...................... | 701/93 |
| 2014/0229081 | A1 * | 8/2014 | Iwase ....................... | F16H 59/66 |
| | | | | 701/51 |

FOREIGN PATENT DOCUMENTS

JP  2007-221843 A  *  8/2007

* cited by examiner

*Primary Examiner* — Michael J Zanelli

(57) ABSTRACT

A method for determining a road slope in an electric vehicle including determining the energy consumed or generated by a propulsion motor of the electric vehicle, determining the speed of the electric vehicle, and computing the road slope using samples of energy and speed of the electric vehicle. The method further including determining an optimal speed at which the vehicle should be driven for achieving maximum utility of energy.

18 Claims, 3 Drawing Sheets

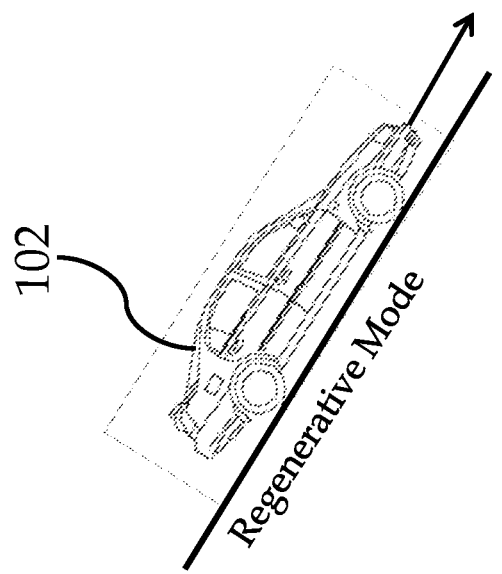
Fig. 1B
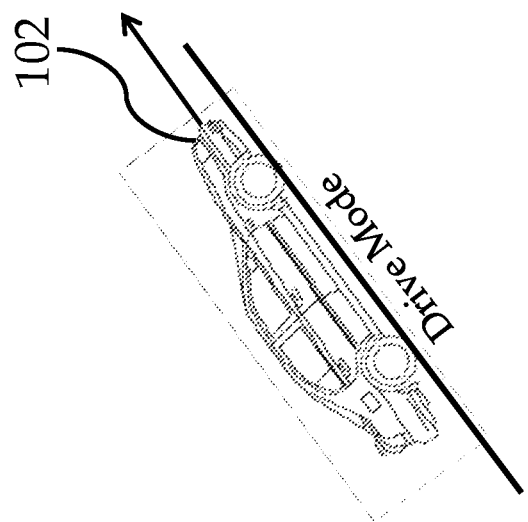
Fig. 1A
Fig. 1

SYSTEM AND METHOD FOR COMPUTING SLOPE OF A ROAD IN AN ELECTRIC VEHICLE

FIELD OF THE INVENTION

The invention relates to an electric vehicle and more specifically the invention relates to road slope detection system for the electric vehicle.

BACKGROUND

The Electric vehicles (EVs) are gaining more and more popularity. An important feature of EVs is the regenerative capabilities enabled with a propulsion motor that also is capable of acting as a generator. This regeneration allows the motion of the vehicle to generate electricity which recharges the battery, thus extending the driving range. Management of this regeneration and calculation of remaining range is a complex issue.

The slope at which the EV is traveling is a significant factor that can be used for various calculations related to the regeneration and range. For example, repeated measurement of slope as an EV travels can help in predicting the number of miles left before the battery is exhausted. It can also aid in controlling the optimal amount of regeneration required. In another example, the slope can be used to advice the driver on driving the EV in a fuel efficient manner or how well they have been driving. Likewise, in an autonomous vehicle, the slope of the road can also be used as a significant factor in computing the desirable EV speed to increase the range.

Presently, the methods used for determining slope of the road or path are costly and complex. The conventional techniques involve use of mechanical devices such as a water tank or pendulum with costly sensor mechanisms, Micro-Electro-Mechanical Systems (MEMS) position or accelerometer sensors. Some of the other methods used for determining the slope of the road involve analysis of transmission gearing, and fuel/air mixture, which are not typically relevant in an EV.

DESCRIPTION OF RELATED ART

Some of the methods involved in the process of determining the slope of the road while traveling in a vehicle are as follow:

The invention disclosed in U.S. Pat. No. 3,952,586 titled "Determining Engine Compression From Starter Motor Current" issued to Richard Eric Hanson and Thomas Edward Nolan on Apr. 27, 1976 teaches an apparatus and method of determining engine compression of a gasoline engine by "comparing the amplitude of the starter motor current, when cranking an engine having its ignition inhibited, with a reference value". This invention illustrates that monitoring motor current can be useful for determining load on the motor. However, this invention only applies to internal combustion engines and does not anticipate using current measurement to determine the slope of the road in an EV. The present invention uses the current measurement in an EV to determine slope of the road both, when energy is being consumed or generated by the EV motor.

The invention disclosed in European Patent EP 0676308 titled "Method and device for measuring road slope" issued to Soung, Gwan-Geong on Oct. 11, 1995 teaches a method of measuring the road slope of a gasoline driven vehicle utilizing various factors to determine gas engine torque and hence road slope. The factors analyzed as disclosed by this invention include transmission gearing which is not relevant to most EVs. Further, this invention does not anticipate use of monitoring an electric motor for uphill travel and does not apply to the downhill mode wherein the electric motor functions as a generator.

Further, the invention disclosed in U.S. Pat. No. 6,755,489 titled "Control Device for Electric Vehicle stopping at Slope Road" issued to Tetsuya Kuno, Masahiro Inden, as on Jun. 29, 2004 discloses a control device for an electric vehicle for controlling a drive torque of the electric motor. The invention further describes a hydraulic brake force adjusting means for adjusting a hydraulic brake force for applying a hydraulic pressure to the wheel cylinder of the wheel independent from a brake pedal operation by jugging whether the vehicle is under a stopping state at a slope road when the drive torque is equal to or greater than the predetermined value. However, this invention does not disclose monitoring of the current consumed by the drive motor in order to determine the slope of the road.

The invention disclosed in EP 2359343 titled "Slope Feedback Device" by Andersson and Bredberg, published on Aug. 24, 2011 teaches another device using slope for informing the driver how to operate the vehicle economically. This invention discloses a method to determine the slope using a plurality of slope profile sensing means such as motor torque, motor friction, total gear ratio, acceleration, rotational speed, lateral speed and the like. Further, the invention discloses use of Global Positioning System (GPS) and other external sensors in order to determine the slope. However, this invention does not disclose monitoring of the current consumed by the drive motor and the speed of the electric vehicle in order to determine the slope of the road.

The technical paper titled "A novel Eco-Driving Application to Reduce Energy Consumption of Electric Vehicles" by Raphael Frank, German Castignani, Raoul Schmitzand Thomas Engel, presented at "International Conference on Connected Vehicles" on Dec. 2, 2013 to Dec. 6, 2013, Las Vegas Nev. discloses a complex method of determining slope using a GPS receiver to determine location and cellular modem to access a web service database to provide the slope information.

Hence, considering the limitations of the existing technologies in the art, there is a need for mechanisms to monitor motor current and apply this to more efficiently calculate the slope of the road.

SUMMARY OF THE INVENTION

A system and method are disclosed for determining the road slope while traveling in an electric vehicle (EV) such as automobiles, golf carts, industrial carts, mining machinery, surveillance vehicles or other land based electric vehicles. The slope is determined from the electric power consumed or generated by the motor. For this purpose, the energy consumed or generated by at least one of the propulsion motor of the electric vehicle is computed by analyzing amount of current flowing to or from the at least one propulsion motor. The current speed of the electric vehicle is considered in the computations. Further, the road slope is computed using at least two samples of energy and speed of the electric vehicle. This information of road slope is used to determine the optimal speed at which the vehicle should be driven in order to attain optimal consumption of a battery bank of the electric vehicle. Additional information may be considered in the computations and a calibration adjustment may be made.

In one embodiment, the energy consumed or generated and speed of electric vehicle are obtained from the motor controller via an internal data network of the electric vehicle wherein the internal data network is a Controller Area Network (CAN) bus as defined by ISO 11898 and SAE J1939 standards and related standards. The CAN bus connects the various electric components of the electric vehicle. Such a network allows the measurement, computation of the road slope, and use of the results to be distributed to different components in a variety of ways.

In one embodiment, a calibration calculation or a calibration table is used for the road slope computation. Once the road slope is determined, it can be further used to compute the probable distance that can be covered by the electric vehicle with the remaining charge in the battery bank. The road slope can be used to compute optimal vehicle speed in order to maximize range of the vehicle with the remaining battery bank. The road slope information and information derived from the road slope is analyzed by the control device to generate inputs to assist the driver or operator for most efficient driving.

BRIEF DESCRIPTION OF THE DRAWINGS

Having thus described the invention in general terms, reference will now be made to the accompanying drawings, which are not necessarily drawn to scale, and wherein

Figure 2:
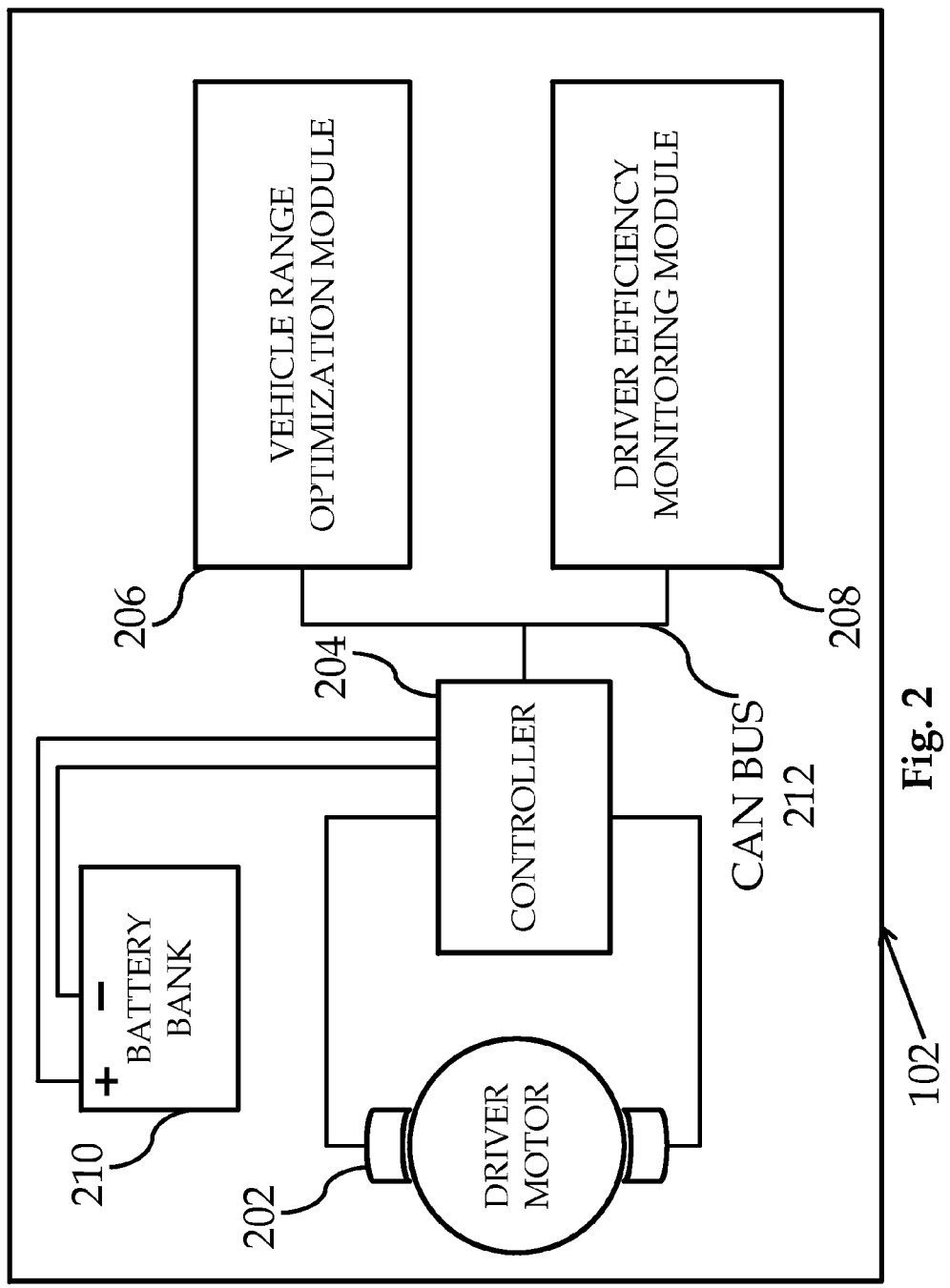
Figure 3:
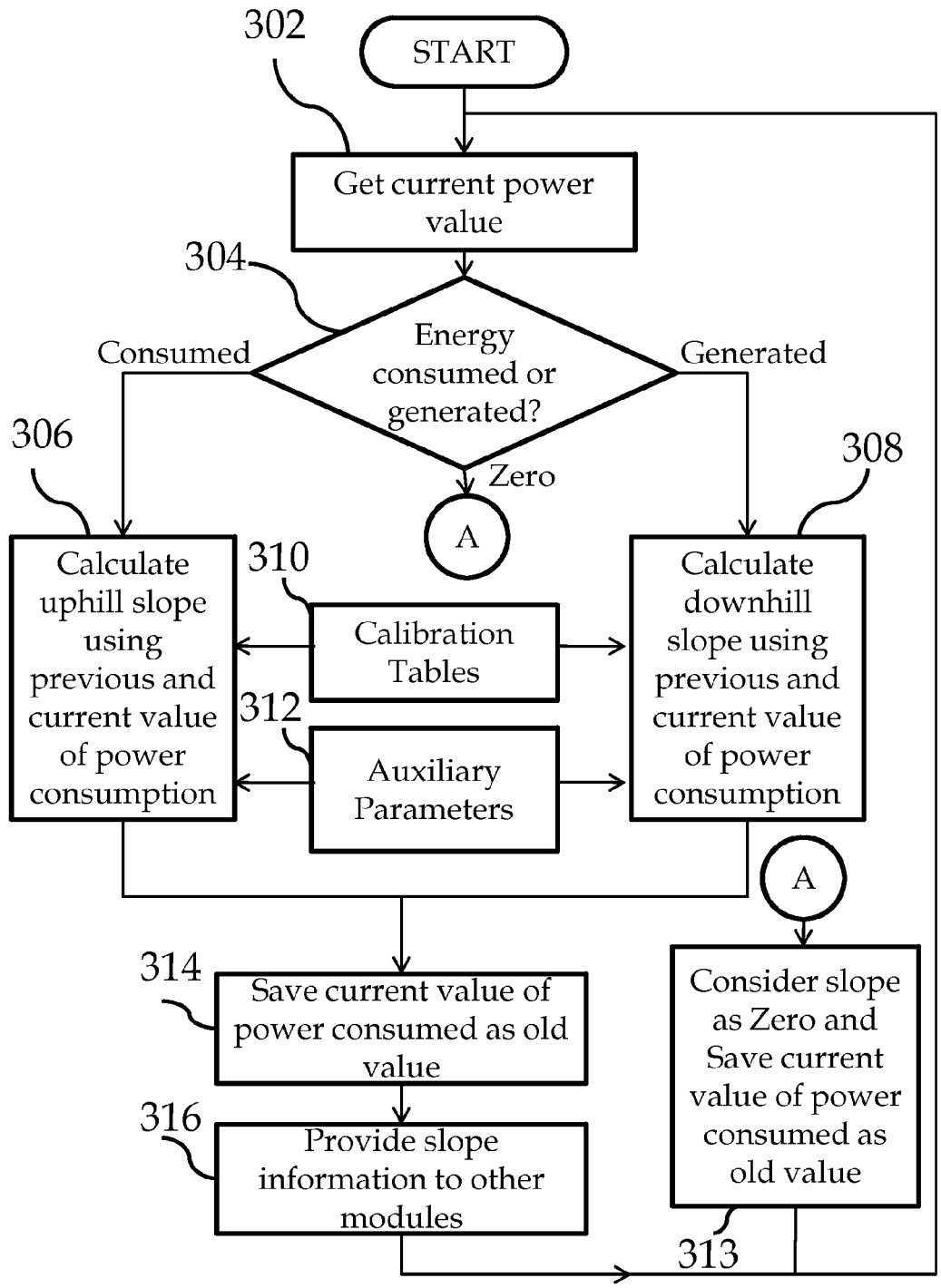

FIG. 1 illustrates an exemplary environment encompassing the various modes in which an electric vehicle is driven, in accordance with an embodiment of the present invention;

FIG. 2 illustrates a block diagram representing the building blocks of the electric vehicle, in accordance with an embodiment of the present invention; and FIG. 3 represents a flowchart for presenting the processing steps involved in the computation of the road slope, in accordance with an embodiment of the invention.

DESCRIPTION OF THE PREFERRED EMBODIMENT

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment representing the various modes of operation of an electric vehicle 102. As represented in FIG. 1A the electric vehicle 102 operates in drive mode while climbing up a hill thus traveling a road slope with positive gradient. Energy is consumed by the drive motor of the electric vehicle 102 while climbing up the hill.

FIG. 1B represents the electric vehicle 102 operating in a regenerative mode while running down the hill thus traveling on a slope with negative gradient. The propulsion motor operates as a generator in the regenerative mode and generates electricity which is further used for charging the battery bank.

A control circuit is used to switch the propulsion motor from drive mode to the regenerative mode and vice versa. The energy consumed and produced in the drive and regenerative modes respectively is directly proportional to the speed of the electric vehicle 102 and the gradient of slope on which it is traveling. Three major factors contributing to the efficiency of the electric vehicle 102 are the energy consumed or generated, the instantaneous speed of the vehicle and the slope of the road on which the electric vehicle 102 is traveling. Other factors which affect the efficiency of the electric vehicle 102 are battery efficiency, rolling resistance, temperature of battery bank and the like.

FIG. 2 illustrated the components of the electric vehicle 102 involved in the process of determining the slope of the road on which the electrical vehicle is traveling. Once the slope is determined, this information can be used by the control circuit to control the speed and optimize the energy consumption and generation of the electric vehicle 102. The electric vehicle 102 comprises of propulsion motor hereafter referred to as a drive motor 202, a controller 204, a vehicle range optimization module 206, a driver efficiency monitoring module 208, a battery bank 210 and a CAN bus 212 connecting the controller 204 with the range optimization monitor 206 and the driver efficiency monitoring module 208. The controller 204 operates the drive motor 202 in the drive mode and the regenerative mode based upon the acceleration and deceleration action performed by the driver of the electric vehicle 102. The controller 204 precisely controls the drive motor 202 and keeps track of the energy consumed or generated by the drive motor 202. The controller 204 sends a control signals over an internal data network i.e. the CAN bus 212 to operate the electric vehicle 102. The controller 204 may frequently transmit messages indicating the current/energy consumed or generated by the drive motor 202.

In one embodiment, the controller 204, vehicle range optimization module 206 and driver efficiency monitoring module 208 each include software code executing on a microprocessor. Alternatively the modules may be combined such that the software may be executed on one or two microprocessors or any similar processing unit.

In one embodiment, the controller 204, vehicle range optimization module 206 and driver efficiency monitoring module 208 can be a software code enabled within a single hardware platform, wherein the hardware platform is enabled with a processing unit to execute the instructions in the software code associated with each of the controller 204, vehicle range optimization module 206 and driver efficiency monitoring module 208. In one embodiment, the step performed by each of the controller 204, vehicle range optimization module 206 and driver efficiency monitoring module 208 can be performed on a microcontroller and plurality of data sensors installed over a hardware platform in the electric vehicle. In one embodiment, the software code associated with the controller 204, range optimization module 206 and driver efficiency monitoring module 208 can also be included in either of the controller 204 of range optimization module 206 or driver efficiency monitoring module 208 itself, such that each of the individual modules can individually perform the computations—for determining the slope.

A plurality of data sensors may be associated with these modules. These control signals may include speed of the electric vehicle 102, power consumed by the electric vehicle 102, temperature and voltage of the battery bank 210, state of charge of the battery bank 210, torque produced by the drive motor 202 and the like.

The vehicle range optimization module 206 continually monitors vehicle status, driving history, state of charge in the battery bank 210, as well as driver inputs such as the "gas" and brake pedals to provide information to the controller 204 to help optimize the range of the electric vehicle 102. An important element of vehicle status is the current road slope. The vehicle range optimization module 206 computes the road slope based upon at least two samples of energy and speed of the electric vehicle.

The driver efficiency monitoring module 208 likewise continually monitors the similar information and additional information such as knowledge of the route to be traveled and the recent driving profile. The driver efficiency monitoring module 208 then provides recommendations to the driver. In one embodiment, the recommendations may include, for example, an estimate of remaining miles before a charge is required or the best speed to drive for achieving maximum range. In another embodiment the recommendations may include a general score of how efficiently the driver is driving. These computations likewise include the current road slope.

The actual calculation of road slope may take place in either of the controller 204, vehicle range optimization module 206 or the driver efficiency monitoring module 208 or a module may perform its own calculation independently of the other modules. Hence the invention may be practiced in multiple instances for the same vehicle, perhaps used in different ways or combined with other parameters as appropriate for the function of the module. Further, each of the different calculations may consider different additional parameters, vary in the required accuracy or timing, and report the results in different ways.

The calculation of road slope is performed repeatedly as the vehicle moves. The repeated calculations are considered to be the instantaneous or continuous measurement of the slope of the road. The process to determine the instantaneous slope can further involve analysis of additional parameters such as change in speed, voltage, braking action, calibration adjustments to account for non-linearity of the components, temperature, or current vehicle weight. The process to compute the instantaneous slope of the road is further explained in FIG. 3 with the help of a flowchart.

FIG. 3 illustrates the steps involved in the process of determining the slope of the road when the electric vehicle 102 is in motion. At step 302, the measurement of power is acquired from the controller 204, typically via the CAN bus. At step 304, it is determined whether the drive motor 202 is operating in drive mode or regenerative mode by analyzing the flow of power to or from the drive motor 202. If the drive motor 202 is consuming energy, at step 306, a positive slope is computed based upon the previously recorded energy consumption and the current energy consumption. Initially, the difference between the current and last power readings is computed. The difference between the current and last power is important because the vehicle may be slowing or accelerating with the current power setting and hence will affect the accuracy of the slope calculation. The change of speed between successive calculations may be substituted or used in addition to the change in power. This change of speed is further used to adjust the power value. Further, at step 306, a calibration table 310 and auxiliary parameters 312 such as speed, weight, temperature of electric vehicle 102 in order to determine the positive slope of the road are considered. Further, in step 304, if the power consumed is equal to zero, then at step 313 the slope of the road is considered as zero, the current value of power consumed is saved as old value and the execution of steps is directly transferred to step 302.

At step 304, if the drive motor 202 is found to be operating in regenerative mode, then at step 308, the slope having negative gradient is determined based upon the previously recorded energy consumption and the current energy consumption. Further, at step 308, additional parameters such as calibration table 310 and auxiliary parameters 312 such as speed, weight, temperature of electric vehicle 102 may also be analyzed in order to determine the negative slope of the road.

At step 314, the present value of power/energy consumption is stored for future referencing. At step 316, this information of slope is further provided to the other software in the vehicle range optimization module 206 or driver efficiency monitoring module 208 for use in subsequent calculations.

In an exemplary embodiment, each time the road slope is needed, the current power value/energy consumed is acquired from the controller 204 by the vehicle range optimization module 206 using the CAN bus 212. This presumably provides the near instantaneous current flowing to or from the propulsion motor 202. If there is no current flowing, it is assumed that the electric vehicle is not moving and the road slope is considered as zero.

If the power is a positive number, the propulsion motor is consuming electricity and hence assumed to be traveling uphill. Otherwise, if the power is negative, it is indicative that the propulsion motor is generating electricity and hence traveling downhill. The appropriate uphill or downhill slope calculation is performed by the vehicle range optimization module 206. Then the present power reading is saved for a subsequent calculation of the road slope. The road slope calculations while traveling uphill are performed in the following manner. Initially, the difference between the current and last power readings is computed. This difference between the current and last power is important because the vehicle may be slowing or accelerating with the current power setting and hence will affect the accuracy of the slope calculation. The change of speed between successive calculations may be substituted or used in addition to the change in power. This change the speed is further used to adjust the power value.

Further, adjustments based upon other parameters such as voltage, temperature, and/or timing, are considered to yield an effective power value. This power value is replaced by a power value relative to the current speed of the vehicle to yield a value that is proportional to the slope of the road. This information is then used to look up the actual slope in a predetermined Calibration table 310. An alternative design would be to perform a further calculation appropriate for the details of the vehicle instead of using a table reference.

The process implementation steps to determine the slope while traveling downhill are similar to those performed while traveling uphill however in this case the power consumed is considered as negative. A different Calibration table 310 is used for computing the slope while travelling downhill. Further, the road slope is converted to a negative number to indicate that the electric vehicle is traveling downhill. Once the slope is computed, it can be used by the driver efficiency monitoring module 208 to determine the driver efficiency and accordingly suggest him optimal speed at which the electrical vehicle is to be driven to maximize the range.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

What is claimed is:

1. A method for determining a road slope in an electric vehicle, the method comprising:
   a microprocessor determining the energy consumed or generated by at least one propulsion motor of the electric vehicle, the at least one propulsion motor being operable in drive mode (consuming energy) and in regenerative mode (generating energy);
   the microprocessor determining the speed of the electric vehicle; and
   the microprocessor computing the road slope using at least two samples of energy and speed of the electric vehicle.

2. The method of claim 1, wherein the energy consumed or generated and the speed of electric vehicle are retrieved by the microprocessor from an internal data network of the electric vehicle.

3. The method of claim 2, wherein the internal data network includes a controller area network (CAN) bus connecting electric components of the electric vehicle.

4. The method of claim 1, further comprising the microprocessor computing probable distance that can be covered by the electric vehicle based on state of charge in a battery bank in the electric vehicle and the road slope.

5. The method of claim 1, further comprising the microprocessor computing optimal electric vehicle speed to maximize range of the electric vehicle based on state of charge in a battery bank in the electric vehicle and the road slope.

6. The method of claim 1, wherein the computed road slope is further adjusted using a calibration adjustment.

7. The method of claim 1, wherein the road slope and information derived from the road slope are analyzed by the microprocessor to generate information for most efficient driving.

8. A method for determining a road slope in an electric vehicle, the method comprising:
   a microprocessor determining the energy consumed or generated by at least one propulsion motor of the electric vehicle by analyzing amount of current drawn or generated by the at least one propulsion motor, the at least one propulsion motor being operable in drive mode (consuming energy) and in regenerative mode (generating energy);
   the microprocessor determining the speed of the electric vehicle;
   the microprocessor computing the road slope using at least two samples of energy and speed of the electric vehicle; and
   the microprocessor determining the optimal speed based on the computed road slope at which the vehicle should be driven for achieving maximum utility of energy.

9. The method of claim 8, wherein the energy consumed or generated and the speed of the electric vehicle is retrieved by the microprocessor from an internal network of the electric vehicle.

10. The method of claim 9, wherein the internal data network is a controller area network (CAN) bus connecting electric components of the electric vehicle.

11. The method of claim 8, wherein the slope of road is utilized by the microprocessor to suggest the driver to drive in a fuel efficient manner.

12. The method of claim 8, wherein road slope is utilized by the microprocessor to optimize the amount of regeneration while driving in a regeneration mode.

13. The method of claim 8, wherein the computed road slope is further adjusted using a calibration calculation or a calibration table.

14. The method of claim 8, wherein the road slope and information derived from the road slope are analyzed by the microprocessor to generate inputs for fuel efficient driving.

15. A system for determining a road slope in an electric vehicle, the system comprising:
   a vehicle range optimization module that uses an indication of energy flow to or from at least one propulsion motor, the current speed of the electric vehicle, and at least two samples of energy flow and/or speed value to compute the slope of the road, the at least one propulsion motor being operable in drive mode (consuming energy) and in regenerative mode (generating energy); and
   an driver efficiency monitoring module that uses the slope to determine an optimal propulsion motor power setting to achieve maximum electric vehicle range.

16. The system of claim 15, wherein the energy consumed or generated by the propulsion motor and speed of the electric vehicle are retrieved from an internal network of the electric vehicle.

17. The system of claim 16, wherein the internal data network includes a controller area network (CAN) bus connecting electric components of the electric vehicle.

18. The system of claim 15, wherein the road slope is further adjusted by a slope computation module using a calibration calculation or a calibration table.

* * * * *